Oct. 21, 1924.
P. KAMINSKI
REMOTE CONTROL SYSTEM
Filed Jan. 25, 1921
1,512,103
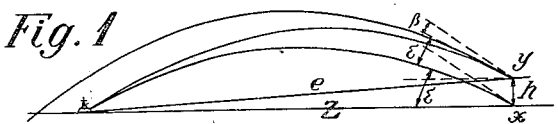
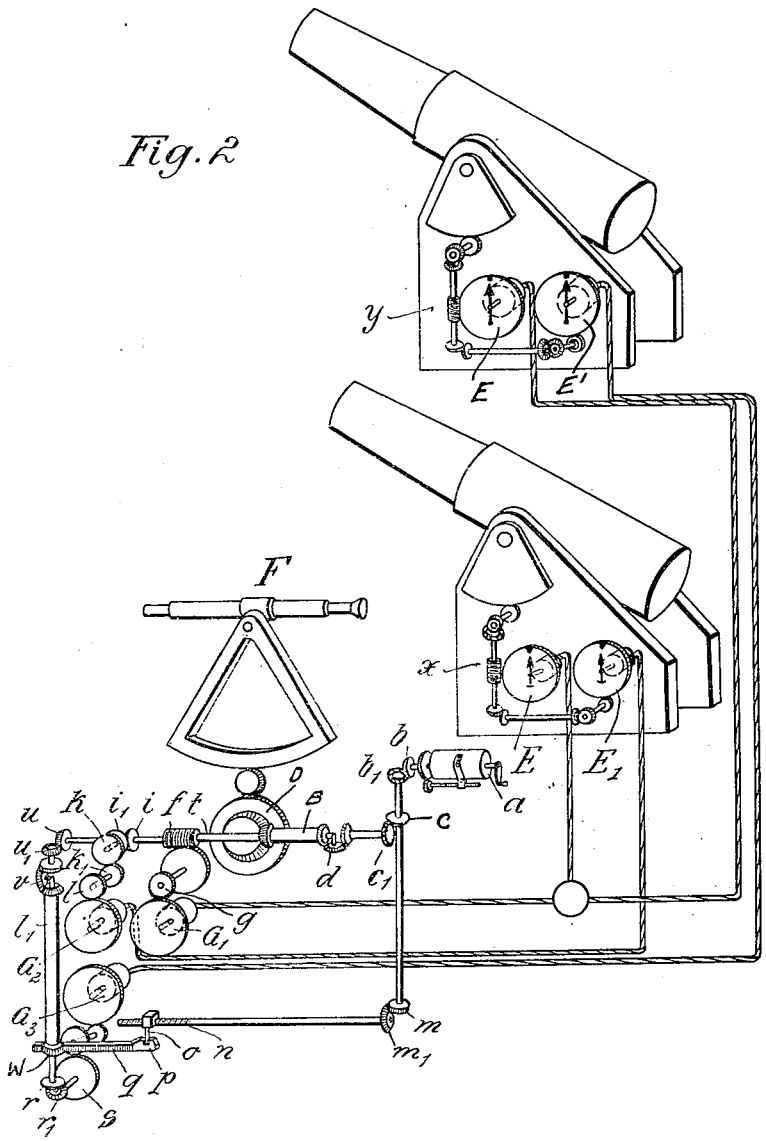
Inventor
Paul Kaminski
by Knight Bros
attys Patented Oct. 21, 1924.

1,512,103

UNITED STATES PATENT OFFICE.

PAUL KAMINSKI, OF BERLIN-PANKOW, GERMANY, ASSIGNOR TO SIEMENS & HALSKE, AKTIENGESELLSCHAFT, OF SIEMENSSTADT, NEAR BERLIN, GERMANY, A GERMAN CORPORATION.

REMOTE-CONTROL SYSTEM.

Application filed January 25, 1921. Serial No. 439,894.

*To all whom it may concern:*

Be it known that I, PAUL KAMINSKI, a citizen of the German Empire, residing at Berlin-Pankow, Germany, have invented certain new and useful Improvements in Remote-Control Systems, of which the following is a specification.

My invention refers to remote control systems and more particularly to the controlling from a distance of guns or other apparatuses.

The remote control systems employed up till now, having mechanisms for coarse and fine adjusting of the elevation of guns or other apparatuses relatively to the object aimed at, operate satisfactorily in all cases in which the guns or the like are disposed at substantially the same level. If, however, they are located at different levels, such as for example the guns, search-lights or other instruments on board a ship there result considerable differences in the adjustments of such apparatus as are not disposed at the observer's level.

It is an object of the present invention to adapt control systems of the kind afore-mentioned to plants in which the guns or other apparatuses are arranged at different levels, the mutual distance between the guns being small as compared with the distance from the object aimed at. For this purpose a special mechanism for fine adjustment is provided for each level which differs from that of the observer's station, and a parallactic correction is applied to this mechanism in accordance with the difference between the levels.

In the drawings affixed to this specification and forming part thereof a system embodying my invention is diagrammatically illustrated by way of example. In the drawings—

Fig. 1 is a diagram showing the trajectories of missiles fired at an object from two different levels, and Fig. 2 is a diagram of an observer's station and two guns controlled thereby.

As shown diagrammatically in Fig. 1 of the drawings, for a certain distance $Z$ from the object aimed at the guns or instruments located at the level $x$ must be adjusted in elevation to the angle $\varepsilon$. If other guns situated at a level $y$ differing from the level $x$ by the distance $h$ were elevated by means of the same remote control system to the same angle $\varepsilon$ these guns would not hit the object. Therefore, a different angle of elevation must be adopted for the guns located at the level $y$. This angle is determined by the difference of level $h$ and the distance $e$ between the upper guns and the mark, and is $\varepsilon - \beta$, wherein $\beta$ results from the value $$\sin \beta = \frac{h}{e}.$$

Since for all practical purposes the difference between the distances $Z$ and $e$ is exceedingly small, and $h$ as compared with $Z$ is very small too, the angle $\beta$ will also be very small, so that in the above value $\sin \beta$ may be safely replaced by $\operatorname{tg} \beta = \frac{h}{z}$ In reducing my invention to practice the remote control device, used up till now and comprising mechanisms for coarse and fine adjustment, is retained for all those guns which are located at the observer's level (Fig. 2). In accordance therewith the device $a$ for setting the distance operates the transmitting device $G_1$ for coarse adjustment by means of the bevel wheels $b$, $b_1$, $c$, $c_1$, the planet gear $d$, the worm gear $f$ and the toothed wheel gear $g$. At the same time the transmitting device for fine adjustment $G_2$ is set correspondingly by means of the bevel-wheels $i$, $i_1$ and the toothed gear wheels $k$, $k_1$, $l$, $l_1$. The movements of the coarse transmitter $G_1$ and the fine transmitter $G_2$ are then transmitted in a well known manner to the coarse receivers $E$ and fine receivers $E_1$ adjusting the guns.

Obviously it is immaterial for the purpose of my invention whether the receivers $E$, $E_1$ on the guns are in the nature of indicators acting on the follow-the-pointer principle or if they act directly upon the power plant of the gun. Furthermore, it is immaterial whether they are connected to the pointing mechanism of the gun or to its sight-setting device. The present diagrammatic illustration may imply any of these well known expedients which the designer may select to suit the particular arrangement which they serve.

For each series of guns located at a different level such as for instance $y$, there is provided a special transmitting device $G_3$ for fine adjustment. The movements of the device $a$ for setting the distance are transmitted to the special fine transmitter $G_3$ by means of the bevel gears $b$, $b_1$, $c$, $c_1$, planet gear $d$, spindle $t$, bevel gears $u$, $u_1$, planet gear $v$, bevel gears $r$, $r_1$, and pinions $s$. An additional movement is further imparted to the fine transmitter $G_3$ by the distance setting device $a$ through the medium of the bevel gears $b$, $b_1$, $m$, $m_1$, spindle $n$, pin $o$, guide $p$, rack $q$, pinion $w$, planet gear $v$, bevel gear $r$ $r_1$, and the pinions $s$, this additional movement corresponding to the difference of level $h$ between the lower guns $x$ and the upper guns $y$.

This additional movement adds to the transmitter $G_3$ the amount of $\frac{h}{Z}$ of the aforementioned formula. Since in this amount to be imparted to the gear $v$, $h$ is a constant, $\frac{h}{Z}$ represents a certain ratio of the variable Z. Inasmuch as the setting device $a$, and therefore bevel gear $m_1$, is turned corresponding to Z, i. e., the range, I vary this movement according to the aforementioned formula by the gearing $n$, $o$, $p$, the pitch of the thread of the spindle $n$ corresponding to the factor $h$.

When the spindle $n$ turns on its axis, the nut of pin $o$ will travel on it, and the pin $o$, suitably engaging the guide $p$, pulls or pushes the latter the desired amount. Guide $p$, the axis of which is parallel to the spindle $n$ is slidably mounted in the apparatus casing, not shown here.

Obviously any other suitable gear mechanism may be employed to transmit the above-mentioned desired amount of inclination correction to the fine transmitter $G_3$.

If the guns are mounted on an oscillating platform such as a ship or air craft the oscillations are compensated for in the usual manner by means of the telescope F and toothed or bevel gearings D transmitting their movements through sleeve B to the planet gear $d$ and thereby influencing all the transmitters of the remote control system.

A special fine transmitter $G_3$ actuated in a similar manner is provided for each additional series of guns placed at a different level.

I claim:

In an electric signalling system for transmitting the angle of inclination to a battery of guns or the like, which are mounted in different horizontal planes, in combination, electrical transmitters for each of the different planes located in a central station, means mechanically connected with said transmitters for setting the range, mechanical means for imparting to said transmitters the required amount of correction of the range, due to the different planes in which the guns are mounted, said means being actuated by said setting means, and electrical receivers on the guns connected to said transmitters.

In testimony whereof I affix my signature.

PAUL KAMINSKI.